No. 785,111. PATENTED MAR. 21, 1905.
A. T. LUNDQVIST.
DETACHABLE LID CONTROLLING AND LOCKING MECHANISM FOR PANS,
KETTLES, OR THE LIKE.
APPLICATION FILED MAR. 18, 1904.

WITNESSES:
Frederick V. Watson
Joel Barnert

INVENTOR
Alexius T. Lundqvist
BY
James B. Newton
ATTORNEY

No. 785,111. Patented March 21, 1905.

UNITED STATES PATENT OFFICE.

ALEXIUS T. LUNDQVIST, OF PATERSON, NEW JERSEY, ASSIGNOR TO THE FAVORITE PAN AND UTENSIL COMPANY, OF PATERSON, NEW JERSEY, A CORPORATION OF NEW JERSEY.

DETACHABLE LID CONTROLLING AND LOCKING MECHANISM FOR PANS, KETTLES, OR THE LIKE.

SPECIFICATION forming part of Letters Patent No. 785,111, dated March 21, 1905.

Application filed March 18, 1904. Serial No. 198,862.

*To all whom it may concern:*

Be it known that I, ALEXIUS T. LUNDQVIST, a citizen of the United States, residing in Paterson, county of Passaic, and State of New Jersey, have invented certain new and useful Improvements in Detachable Lid Controlling and Locking Mechanism for Pans, Kettles, or the Like; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to pots or pans and similar cooking utensils. Its object is to provide simple means for controlling the lid by manipulation of the handle or bail and, on the other hand, for locking said lid and bail. A further object is to construct said lid controlling and locking means in such a manner that the same can be readily and quickly attached to pots or pans of various makes and constructions.

The invention consists in the improved pot or cooking utensil, its lid controlling and locking mechanism, and in the combination and arrangement of the various parts thereof, substantially as hereinafter more fully described, and finally embodied in the clauses of the claim.

The invention is clearly illustrated in the accompanying drawings, in which like letters of reference indicate corresponding parts in each of the several figures.

Figure 1:
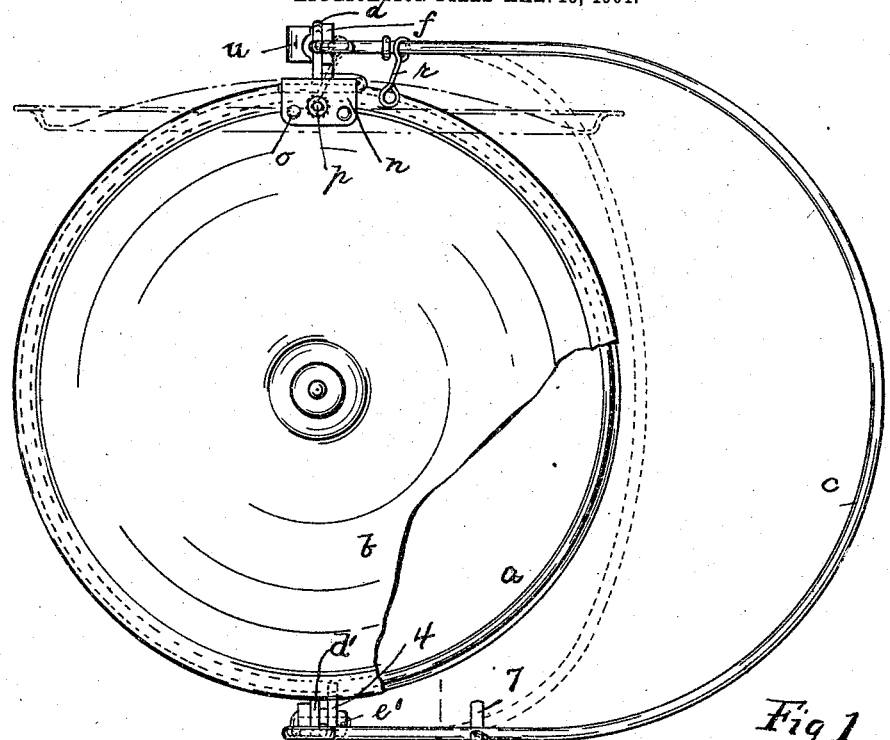
Figures 2, 3:
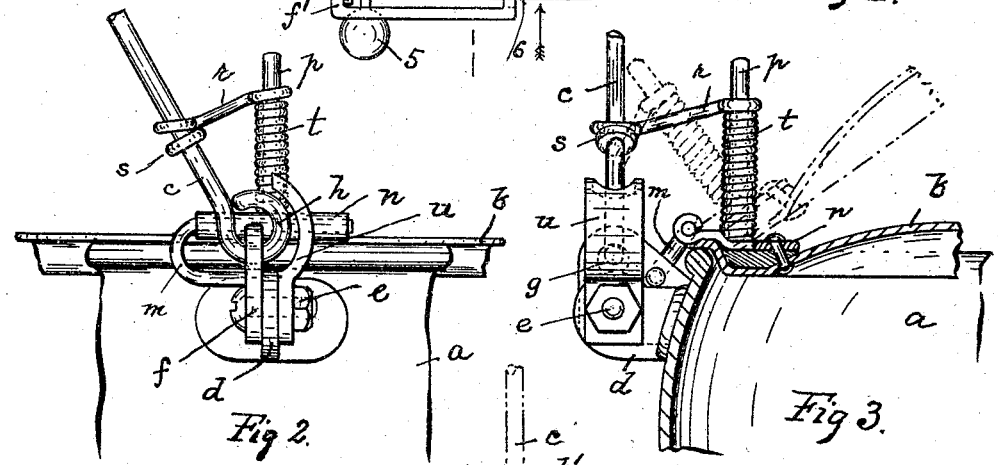
Figures 4, 5:
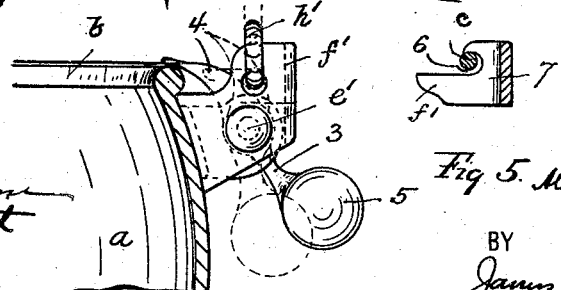

Figure 1 is a top plan view of the pan and its lid, partly broken away and provided with my improvement; Fig. 2, an enlarged detail view of the lid opening and closing mechanism; Fig. 3, a side elevation of Fig. 2; Fig. 4, an enlarged detail view of the lid-locking mechanism, and Fig. 5 a detail view of a portion of the bail or handle locking device.

In said drawings, $a$ represents a pan, $b$ the lid, and $c$ the bail or handle.

To the ear $d$ on one side of the pan is removably secured, by means of a bolt and nut $e$, a bracket $f$, provided in its upper portion with a hole or opening in which is hinged the looped portion $h$ of the bail $c$. A substantially U-shaped rod $m$ projects from said bracket and forms the hinge-pin for a hinge $n$, which latter is secured to the lid $b$ by rivets $o$ or in any desired manner.

Projecting from the hinge $n$ and at right angles thereto is a pin $p$, adapted to receive one end of a link $r$, the other end of which is arranged on the bail $c$. The downward movement of said link is limited, respectively, by a collar $s$ on bail $c$ and by the top of a wire coil $t$ on the pin $p$, as will be manifest. To the ear $d$ is likewise removably secured by the bolt and nut $e$ a bracket $u$, projecting upward and adapted to limit the rearward movement of the bail or handle $c$, all as clearly shown in Figs. 1, 2, and 3. To the ear $d'$ on the opposite side of the pan is removably secured, by means of a bolt and nut $e'$, a bracket $f'$, substantially U-shaped and provided in its upper portion with a hole or opening for the reception of the looped end $h'$ of bail $c$. On the said bolt is fulcrumed a weighted lever 3, adapted with its upper pointed end to engage the edge of the lid, and thus hold the same tight on the pan when the bail is turned or moved downward into the position shown in Fig. 1. During said downward movement the looped portion $h'$ bears against the cam or curved portion 4 of said weighted lever 3, and thus moves the same against the action of the weight 5 into the locking position. In that position the bail or handle is likewise locked by engaging the curved recess 6 in the projecting end 7 of the bracket $f'$. (See Figs. 1 and 5.)

In operation when the lid or cover is to be raised the link $r$ (which normally is carried by the bail $c$) is placed upon the pin $p$ and the handle is then moved downward and locked in recess 6. By this downward movement the lid is raised and the hinge-pin $m$ forms its axis or fulcrum. When it is desired to close the lid, the bail $c$ is moved out of the recess 6 and is returned to a vertical position. When it is desired to lock the lid, the link $r$ is removed (thus disconnecting the bail and lid) and the bail is moved downward and, as heretofore stated, in its downward movement presses against the cam or curved portion 4 of the weighted lever 3 until the pointed portion of the latter engages the edge of the lid. The bail is locked in the recess 6 the same as already described.

From the foregoing description it is apparent that my improved lid controlling and locking mechanism is very simple and effective, can be easily handled, and can be quickly and readily attached to pans, pots, or other cooking utensils of various makes or constructions.

Having thus described my invention, what I claim as new, and desire to secure by Letters Patent, is—

1. The combination with a pan or vessel, of a lid, a hinged connection between the lid and the ear of the vessel, a bolt and nut for removably securing said hinged connection to the ear, a bail or handle for the vessel, and means arranged on the lid and bail for opening and closing said lid, substantially as described.

2. The combination with a pan or vessel, of a lid, a hinged connection between the lid and the ear of the vessel, a bolt and nut for removably securing said hinged connection to the ear, a bail or handle for the vessel, a pin carried by the lid, and a link carried by the handle and adapted to engage said pin when the lid is to be opened, substantially as described.

3. The combination with the pan or vessel, of a lid, a bracket removably secured to one ear of the vessel, a bolt and nut for removably securing said bracket to the ear, a hinged connection between the lid and the bracket, a bail or handle for the vessel and pivotally arranged with one end in said bracket, and means arranged on the lid and bail for opening and closing said lid, substantially as described.

4. The combination with a pan or vessel, of a lid, a hinged connection between the lid and the ear of the vessel, a bolt and nut for removably securing said hinged connection to the ear, a bail or handle for the vessel, means on the lid and bail for opening and closing said lid, and a stop on the vessel for limiting the rearward movement of the bail, substantially as described.

5. The combination with a pan or vessel, of a lid, a bracket removably secured to one ear of the vessel, a bolt and nut for removably securing said bracket to the ear, a substantially U-shaped rod projecting from said bracket, and forming a fulcrum for the lid, a bail or handle for the lid, and means arranged on the lid and bail for opening and closing the lid, substantially as described.

6. The combination with a pan or vessel, of a lid, a weighted lever pivotally arranged on one ear of the vessel and adapted with its free end to engage the lid when closed, and a bail or handle for the vessel and adapted to control the weighted lever, all said parts, substantially as described.

7. The combination with a pan or vessel, of a lid, a weighted lever pivotally arranged on one ear of the vessel and adapted with its free end to engage the lid when closed, a bail for the vessel and adapted to control the weighted lever, and means for locking the handle, when the lid is closed, substantially as described.

8. The combination with a pan or vessel, of a lid, a bracket removably arranged on one ear of the vessel, a bail or handle for the vessel and pivotally connected with said bracket, a weighted fulcrumed lever controlled by said bail and removably arranged on the ear of the vessel, and adapted with its free end to engage the lid when closed, and means for locking the bail, when said lid is closed, substantially as described.

In witness whereof I have hereunto set my hand in presence of two witnesses.

ALEXIUS T. LUNDQVIST.

Witnesses:
J. H. NELLIS,
J. B. NEWTON.